United States Patent
Mizusaki et al.

(10) Patent No.: US 10,359,030 B2
(45) Date of Patent: Jul. 23, 2019

(54) PLUNGER PUMP

(71) Applicant: NISSIN KOGYO CO., LTD., Ueda-shi, Nagano (JP)

(72) Inventors: Yoshinobu Mizusaki, Ueda (JP); Tsuyoshi Maruyama, Ueda (JP); Takuro Kodama, Ueda (JP)

(73) Assignee: Nissin Kogyo Co., Ltd., Nagano (JP)

( * ) Notice: Subject to any disclaimer, the term of this patent is extended or adjusted under 35 U.S.C. 154(b) by 321 days.

(21) Appl. No.: 14/358,124

(22) PCT Filed: Nov. 16, 2012

(86) PCT No.: PCT/JP2012/079781
§ 371 (c)(1),
(2) Date: May 14, 2014

(87) PCT Pub. No.: WO2013/073666
PCT Pub. Date: May 23, 2013

(65) Prior Publication Data
US 2014/0308143 A1    Oct. 16, 2014

(30) Foreign Application Priority Data

Nov. 17, 2011    (JP) .................................. 2011-251827

(51) Int. Cl.
*F04B 9/06*     (2006.01)
*F04B 1/04*     (2006.01)
*B60T 8/40*     (2006.01)

(52) U.S. Cl.
CPC .............. *F04B 9/06* (2013.01); *B60T 8/4031* (2013.01); *F04B 1/0408* (2013.01); *F04B 1/0421* (2013.01); *F04B 1/0439* (2013.01)

(58) Field of Classification Search
CPC .... F04B 1/0421; F04B 1/0439; F04B 1/0408; F04B 9/06; B60T 8/4031
(Continued)

(56) References Cited

U.S. PATENT DOCUMENTS

| | | | |
|---|---|---|---|
| 6,042,350 A | | 3/2000 | Beck |
| 6,866,489 B2 * | | 3/2005 | Hinz ..................... B60T 8/4031 |
| | | | 137/454.4 |

(Continued)

FOREIGN PATENT DOCUMENTS

| | | | | |
|---|---|---|---|---|
| DE | 102008029245 A1 * | 9/2009 | ............ | B60T 8/4031 |
| EP | 2 306 012 A2 | 4/2011 | | |

(Continued)

OTHER PUBLICATIONS

English Translation of the Specification for JP2009203885 A (Hoshi).*

(Continued)

*Primary Examiner* — Dominick L Plakkoottam
*Assistant Examiner* — Connor J Tremarche
(74) *Attorney, Agent, or Firm* — Carrier Blackman & Associates, P.C.; Joseph P. Carrier; Fulchand P. Shende

(57) ABSTRACT

A plunger pump is provided which comprises: a pump body having a cylinder hole with an expanded diameter section; a plunger defining, together with the lid member, a pump chamber; and a coiled spring disposed within the expanded diameter section. The coiled spring includes: an effective winding section; a lid-side seat winding section; and a plunger-side seat winding section. The lid-side seat winding section has an outer diameter larger than an outer diameter of the effective winding section, and the plunger-side seat winding section has an outer diameter smaller than an outer diameter of the plunger. With this configuration, the coiled spring within the pump chamber can have increased stability, and can be located in the center of the pump chamber.

5 Claims, 3 Drawing Sheets

(58) Field of Classification Search
USPC .......................................... 417/470; 137/454.4
See application file for complete search history.

(56) References Cited

U.S. PATENT DOCUMENTS

| | | | | |
|---|---|---|---|---|
| 7,871,251 B2* | 1/2011 | Marino | ................ | F02M 59/462 |
| | | | | 137/539 |
| 2008/0310979 A1* | 12/2008 | Schepp | ..................... | F04B 7/04 |
| | | | | 417/549 |

FOREIGN PATENT DOCUMENTS

| | | | | |
|---|---|---|---|---|
| EP | 2687724 A1 | | 1/2014 |
| JP | H11-509906 A | | 8/1999 |
| JP | 2009-203885 A | | 9/2009 |
| JP | 2009203885 A | * | 9/2009 |
| JP | 2010221873 A | * | 10/2010 |
| JP | 2011-064129 A | | 3/2011 |

OTHER PUBLICATIONS

English Translation of JP 2010-221873 (Nakamura) obtained Mar. 13, 2017.*
English Translation of DE 102008029245 A1 (Vogel).*
Notice of Reasons for Rejection dated Nov. 22, 2013 in corresponding JP Patent Application 2011-251827.
Extended European search report dated Nov. 23, 2015 corresponding to Application No. EP 12 84 9994.4.

* cited by examiner

PLUNGER PUMP

TECHNICAL FIELD

The present invention relates to a plunger pump.

BACKGROUND ART

There have been known plunger pumps in which a drive member such as an eccentric cam reciprocates a plunger (also called a piston) within a pump chamber in the axial direction to cause a fluid sucked into the pump chamber through a suction port to be discharged through a discharge port of the pump chamber.

Among examples of the above plunger pumps are ones that include: a pump body having a cylinder hole; a spherical lid member inserted by pressing in the cylinder hole; a plunger that defines, together with the lid member, a pump chamber and is in contact with a drive member; a seal member that is fit over the plunger; and a coiled spring that is in contact with the lid member and also with the plunger (see Patent Document 1, for example).

RELATED ART DOCUMENT

Patent Document

[Patent Document 1] Japanese Laid-Open Patent Application, Publication No. 2011-064129

SUMMARY OF THE INVENTION

Problem to be Solved by the Invention

In the aforesaid plunger pumps of the related art, the diameter of the cylinder hole is expanded according to the outer diameter of the seal member. Further, the coiled spring as a whole has a uniform diameter, and has an outer diameter approximately the same as the outer diameter of the plunger. With this configuration, the outer diameter of the coiled spring is extremely small relative to the inner diameter of the cylinder hole and to the diameter of the lid member, which leads to a risk that the end of the coiled spring on the lid member side may deviate in the radial direction of the lid member.

It is an objective of the present invention to provide a plunger pump that can increase stability of a coiled spring which is compressed and stretched within a pump chamber.

Means to Solve the Problem

To solve the above-mentioned problem, the present invention provides a plunger pump comprising: a pump body having a cylinder hole with a reduced diameter section and an expanded diameter section; a spherical lid member inserted by pressing in the expanded diameter section; a plunger disposed in a slidable manner in the reduced diameter section, and having one end defining, together with the lid member, a pump chamber, and the other end abutting on a drive member; a seal member held within the expanded diameter section and fit over the plunger; and a coiled spring disposed within the expanded diameter section.

The coiled spring includes: an effective winding section compressible and stretchable in the axial direction of the plunger; a lid-side seat winding section abutting on a surface of the lid member; and a plunger-side seat winding section abutting on an end surface of the plunger.

The lid-side seat winding section has an outer diameter larger than an outer diameter of the effective winding section and smaller than or equal to an inner diameter of the expanded diameter section, and the plunger-side seat winding section has an outer diameter smaller than an outer diameter of the plunger.

In the plunger pump of the present invention, since the lid-side seat winding section has a diameter larger than the outer diameter of the effective winding section abuts against the lid member, the coiled spring hardly deviates in the radius direction of lid member, compared to one in which the lid-side seat winding section has the same diameter as the effective winding section. Accordingly, the coiled spring which is compressed and stretched within the pump chamber can have increased stability.

Further, since the coiled spring has one end received by the surface (the spherical surface) of the lid member, the axial center of the coiled spring is automatically aligned with the center of the lid member. Accordingly, the coiled spring can be located in the center of the pump chamber.

In the plunger pump, in a case where the outer diameter of the effective winding section is larger than the outer diameter of the plunger-side seat winding section, the coiled spring can have increased and stabilized spring force. This configuration prevents the effective winding section which is compressed and stretched from rubbing the inner circumferential surface of the expanded diameter section and enables the outer diameter of the effective winding section to be enlarged by effective use of the inner diameter of the expanded diameter section.

As described above, in the plunger pump of the present invention, the coiled spring can have increased stability. Accordingly, the plunger pump may be configured so that the plunger has the opposite end surfaces as flat surfaces, one of the opposite end surfaces being adapted to directly receive the other end of the coiled spring.

With this configuration, there is no need to provide a section on the end of the plunger for receiving the coiled spring. Accordingly, manufacturing costs can be reduced.

Further, the opposite ends of the plunger are of the same shape, which relieves restriction on the orientation of the plunger in the cylinder hole. Accordingly, assembly workability of the plunger can be improved.

In the plunger pump, in a case where the lid-side seat winding section is made of a wire having a circular cross section, and the plunger-side seat winding section has a contact surface which makes a face-to-face contact with the end surface of the plunger, the contact between the plunger-side seat winding section and the plunger is a face-to-face contact between flat surfaces, and the contact between the lid-side seat winding section and the lid member is a line-to-line contact between bent surfaces. Accordingly, stability of the coiled spring can be further increased.

In the plunger pump, preferably, a part of the lid member extends past the lid-side seat winding section toward the plunger-side seat winding section side.

With this configuration, the lid-side seat winding section is fit in an annular space formed between the surface of the lid member and the inner circumferential surface of the expanded diameter section. Accordingly, the lid-side seat winding section can be further stabilized with respect to the lid member, and the coiled spring can be reliably located in the center of the pump chamber.

In the plunger pump, preferably, the lid-side seat winding section is located at one end side of the cylinder hole with respect to a suction port of and a discharge port of the pump chamber.

With this configuration, the lid-side seat winding section is located in a position not opposed to the suction port and the discharge port. Accordingly, passages can be ensured between the suction port and the discharge port and the inside of the pump chamber. Also, the lid-side seat winding section is less subjected to negative pressures generated at the suction port and the discharge port during the drive of the plunger pump. Accordingly, the lid-side seat winding section can be further stabilized with respect to the lid member.

In the plunger pump, preferably, the effective winding section has an inner diameter larger than the outer diameter of the plunger.

With this configuration, if the coiled spring is assembled into the cylinder hole in the reverse orientation, the plunger is inserted into the lid-side seat winding section and the effective winding section and enveloped in the effective winding section. In this state, no load is applied to the coiled spring when the coiled spring is assembled into the cylinder hole. Accordingly, it is easy and certain to notice wrong assembly of the coiled spring into the cylinder hole.

Advantageous Effects of the Invention

According to the plunger pump of the present invention, the coiled spring which is compressed and stretched within the pump chamber can have increased stability and can be located in the center of the pump chamber.

EMBODIMENT FOR CARRYING OUT THE INVENTION

Next, an embodiment of the present invention will be explained in detail with reference to the drawings.

In the present embodiment, an example of a plunger pump is illustrated which is used as a hydraulic pressure generating device for a brake fluid pressure control apparatus to be mounted on a vehicle such as an automobile.

In the following explanation, one end side and the other end side correspond to the left side and the right side in FIG. 1, respectively.

Figure 1:
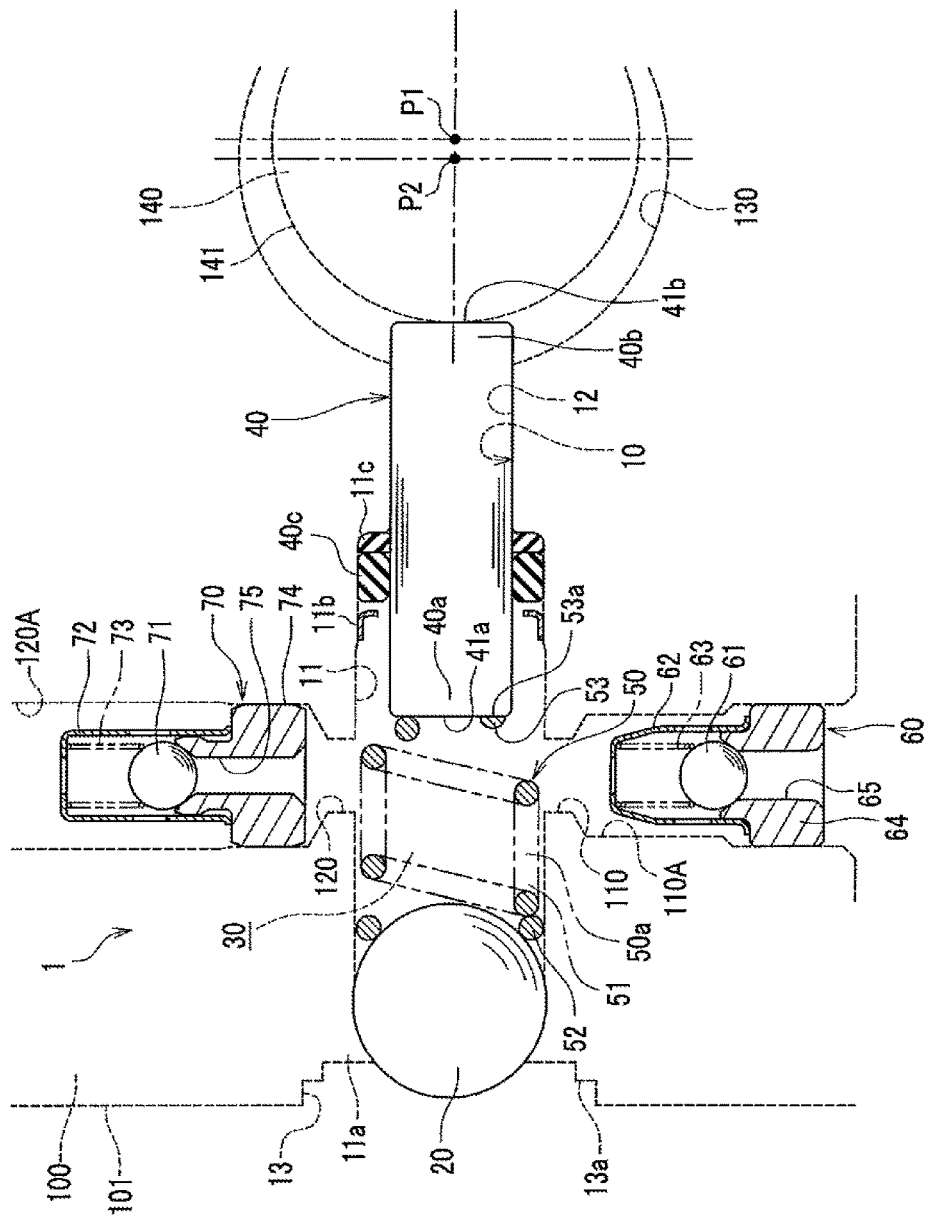
FIG. 1 is a sectional side elevation of a plunger pump of an embodiment of the invention.

As shown in FIG. 1, a plunger pump 1 includes: a pump body 100 having a cylinder hole 10; a lid member 20 for sealing one end of the cylinder hole 10; a plunger 40 defining, together with the lid member 20, a pump chamber 30, and being in contact with an eccentric cam 140 (a "drive member" in the claims); a seal member 40c that is fit over the plunger 40; and a coiled spring 50 for pressing the plunger 40 on the eccentric cam 140.

In the plunger pump 1, the plunger 40 reciprocates within the cylinder hole 10 in the axial direction thereof, to cause a brake fluid sucked into the pump chamber 30 through a suction port 110 thereof to be discharged through a discharge port 120 of the pump chamber 30.

The pump body 100 is a metal member of an approximately rectangular parallelepiped shape to be mounted on a vehicle. Inside the pump body 100, there are formed a plurality of fluid passages (not shown), as well as the cylinder hole 10 of a circular cross section into which the plunger 40 is to be inserted (see FIG. 2).

The cylinder hole 10 has one end open at one surface 101 of the pump body 100 and the other end communicating with a bearing hole 130. That is, the cylinder hole 10 extends in the right-left direction in FIG. 1 from the one surface 101 of the pump body 100 toward the center thereof.

The cylinder hole 10 has: a stepped expanded diameter section 11 of a cylindrical shape formed at a portion on one end side of the cylinder hole 10 with respect to the center in the axial direction of the cylinder hole 10; and a reduced diameter section 12 of a cylindrical shape formed at a portion on the other end side of the cylinder hole 10 with respect to the center in the axial direction of the cylinder hole 10.

The expanded diameter section 11 serves as a space for accommodating the seal member 40c, and thus has a diameter expanded, compared to the diameter of the reduced diameter section 12, according to the outer diameter of the seal member 40c.

An opening portion 13 on the one end side of the cylinder hole 10 has a diameter expanded in diameter compared to the diameter of the expanded diameter section 11, and is provided with an annular bottom portion 13a.

The lid member 20 as a metal spherical body is inserted by pressing in the expanded diameter section 11. The lid member 20 seals the one end of the cylinder hole 10.

The outer diameter of the lid member 20 is slightly larger than the inner diameter of the expanded diameter section 11 of the cylinder hole 10. Further, a retaining section 11a for the lid member 20 is formed at the one end side of the cylinder hole 10 with respect to the center of the lid member 20.

The retaining section 11a is a section formed by plastically deforming an inner circumferential surface (hole wall) of the cylinder hole 10. When the lid member 20 is inserted by pressing into the expanded diameter section 11, the bottom portion 13a of the opening portion 13 is pressed by using a jig so that the bottom portion 13a protrudes toward the inner direction of the expanded diameter section 11, whereby the lid member 20 is locked by the inner circumferential surface of the expanded diameter section 11 to thereby form the retaining section 11a.

The eccentric cam 140 is housed within the bearing hole 130. The eccentric cam 140 is provided at the output shaft of an electric motor (not shown) attached to the pump body 100.

The center position P1 of the eccentric cam 140 is eccentric with respect to the shaft center P2 of the output shaft. The eccentric cam 140 rotates around the shaft center P2 of the output shaft in accordance with the rotation of the output shaft.

Figure 2:
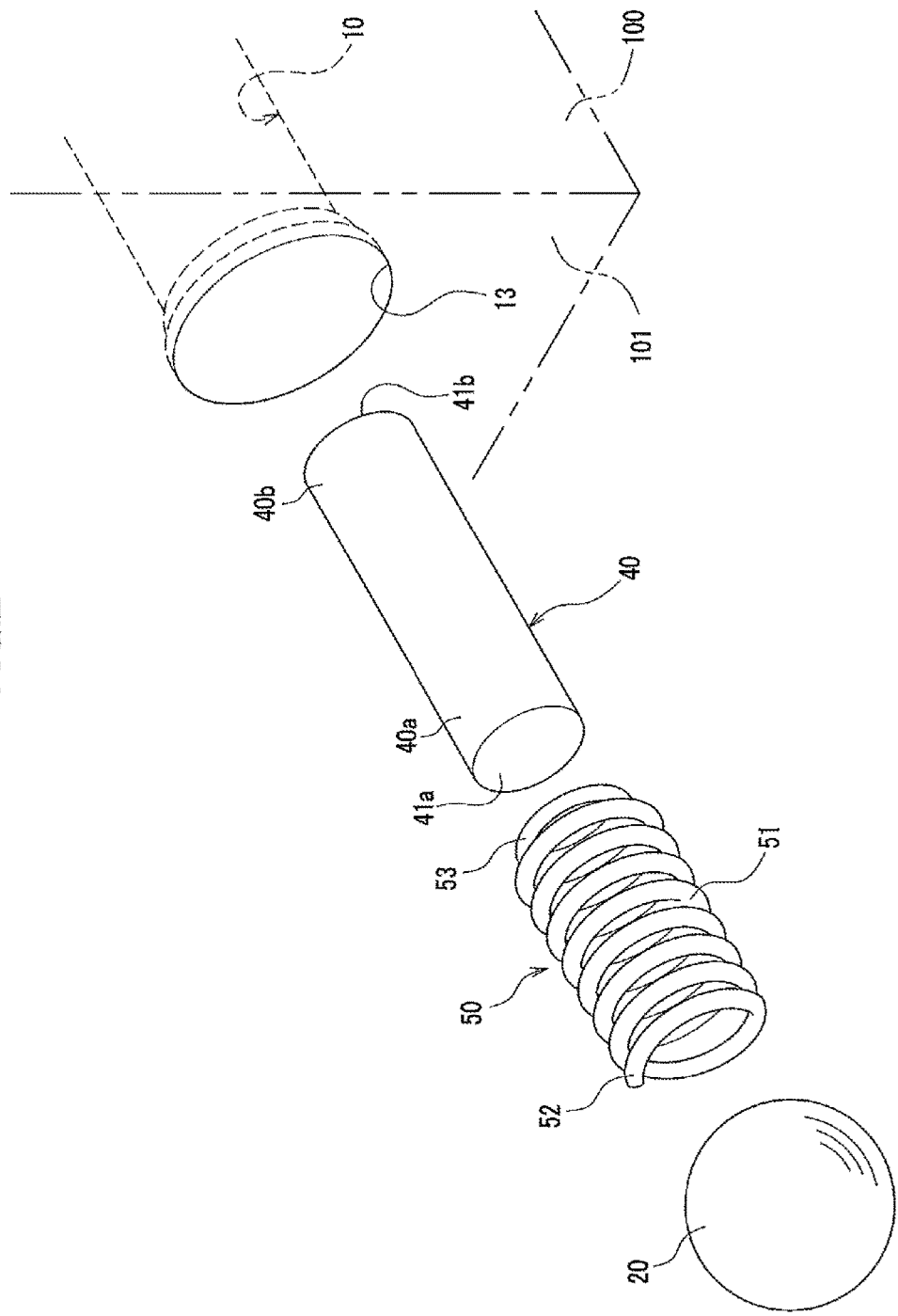
FIG. 2 is an exploded perspective view of the plunger pump of the embodiment of the invention.

The plunger 40 is a metal component having a circular cross sectional shape that is inserted in the reduced diameter section 12 of the cylinder hole 10 in a slidable manner (see FIG. 2). The plunger 40 has one end 40a that is protruded into the expanded diameter section 11 and the other end 40b that is protruded into the bearing hole 130.

The pump chamber 30 is defined within the cylinder hole 10 by: the outer surface of the one end 40a of the plunger 40; the inner circumferential surface of the expanded diameter section 11; and a portion, of the surface of the lid member 20, that protrudes into the expanded diameter section 11.

The seal member 40c is fit approximately at the center of the plunger 40. The seal member 40c is an annular resin member. The seal member 40c fluid-tightly seals between the outer circumferential surface of the plunger 40 and the inner circumferential surface of the expanded diameter section 11.

The seal member 40c is positioned in place between two annular stoppers 11b, 11c fit on the inside at the bottom of the expanded diameter section 11.

The end surface 41a on the one end 40a side and the end surface 41b on the other end 40b of the plunger 40 are formed as planes perpendicular to the axial direction of the plunger 40. In other words, the plunger 40 has the opposite end portions of the same shape.

The end surface 41b on the other end 40b side of the plunger 40 abuts against the cam surface 141 of the eccentric cam 140. When the output shaft is rotated, the plunger 40 is pushed and moved by the cam surface 141 in the axial direction toward the one end side of the cylinder hole 10.

The coiled spring 50 is an elastic member formed by winding a wire 50a of a circular cross sectional shape. The coiled spring 50 includes: an effective winding section 51 which is compressible and stretchable in the axial direction of the plunger 40; a lid-side seat winding section 52 which abuts against the surface of the lid member 20; and a plunger-side seat winding section 53 which abuts against the end surface 41a of the plunger 40.

The coiled spring 50 is disposed within the expanded diameter section 11, compressed and pressing the plunger 40 on the eccentric cam 140. The eccentric cam 140 pushes and moves the plunger 40, and then, the cam surface 141 moves away from the plunger 40, when the pressing force of the coiled spring 50 urges the plunger 40 to move toward the cam surface 141 side. As a result, the plunger 40 is kept abutted against the cam surface 141.

Figure 3:
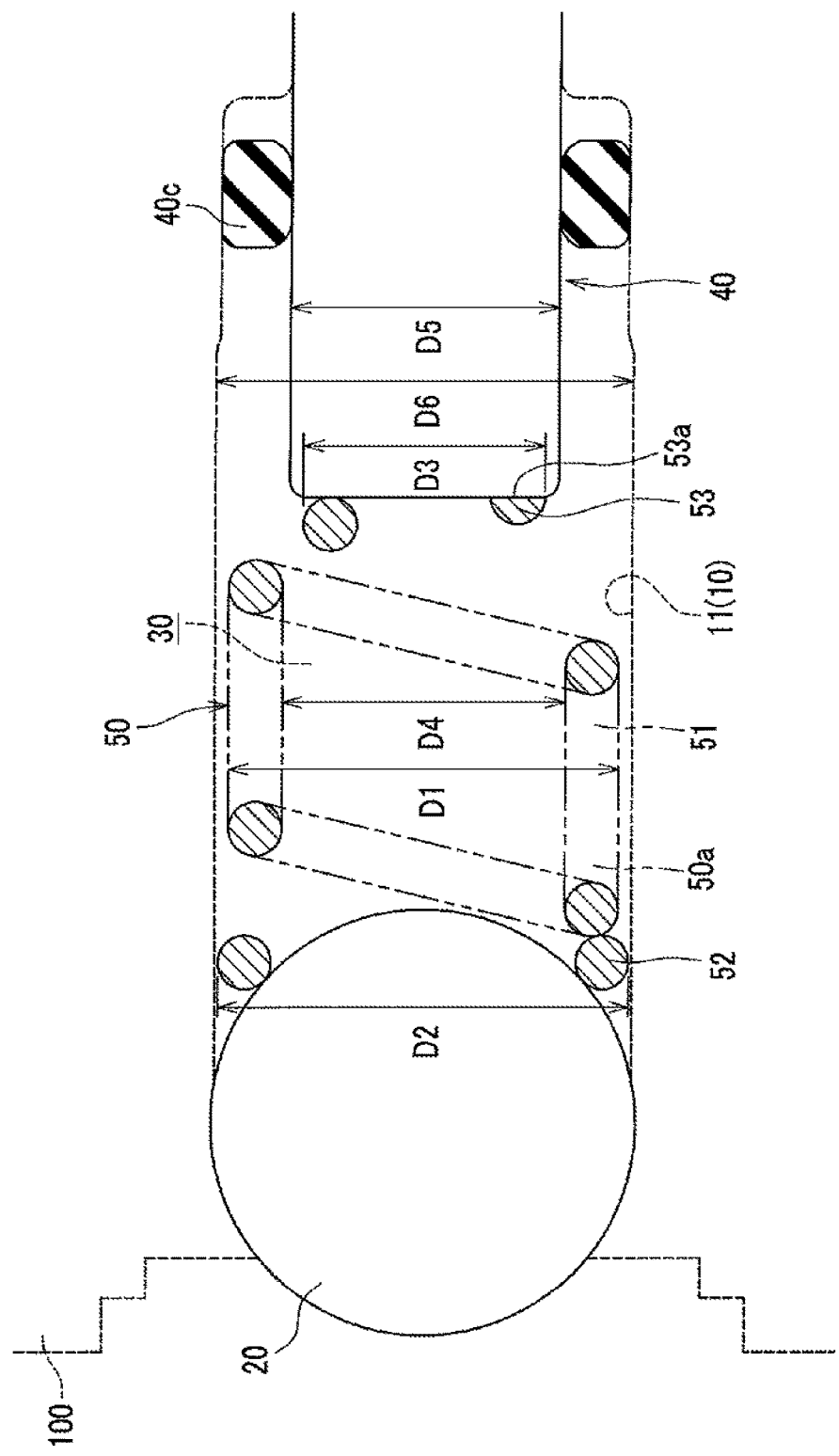
FIG. 3 is a view for comparing diameters of respective sections of a coiled spring and diameters of a plunger and an expanded diameter section with each other.

As shown in FIG. 3, the plunger-side seat winding section 53 has an outer diameter D3 smaller than the outer diameter D5 of the plunger 40.

The plunger-side seat winding section 53 has, on the tip end side (the plunger 40 side) thereof, a contact surface 53a parallel to the end surface 41a of the plunger 40. The contact surface 53a is formed by processing such as, for example, abrasion. Thus, the contact between the plunger-side seat winding section 53 and the plunger 40 is at least partially a face-to-face contact between flat surfaces.

This means that the plunger-side seat winding section 53 abuts stably against the end surface 41a of the plunger 40, which ensures that the plunger-side seat winding section 53 is received by the end surface 41a of the plunger 40.

The effective winding section 51 has an outer diameter D1 larger than the outer diameter D3 of the plunger-side seat winding section 53 and smaller than an inner diameter D6 of the expanded diameter section 11.

The effective winding section 51 has an inner diameter D4 larger than the outer diameter D5 of the plunger 40.

The lid-side seat winding section 52 has an outer diameter D2 larger than the outer diameter D1 of the effective winding section 51 and slightly smaller than the inner diameter D6 of the expanded diameter section 11. With this configuration, the inner circumferential surface of the expanded diameter section 11 restrains movement in the radial direction of the lid-side seat winding section 52, locating the coiled spring 50 in the center of the pump chamber 30 (of the expanded diameter section 11).

Further, when the plunger 40 applies a load to the coiled spring 50 to compress the coiled spring 50, the lid-side seat winding section 52 keeps abutting against the inner circumferential surface of the expanded diameter section 11 without greatly deviating therefrom, which prevents the effective winding section 51 from making contact with the inner circumferential surface of the expanded diameter section 11.

The lid-side seat winding section 52 has a tip end side which has not undergone processing such as for example abrasion, and thus the contact of the lid-side seat winding section 52 with the lid member 20 is a line-to-line contact between the bent surfaces.

The outer diameter D2 of the lid-side seat winding section 52 may be the same as the inner diameter D6 of the expanded diameter section 11. Preferable, however, as in the present embodiment, the outer diameter D2 of the lid-side seat winding section 52 is slightly smaller than the inner diameter D6 of the expanded diameter section 11 so that a clearance is formed between the outer circumference of the lid-side seat winding section 52 and the inner circumferential surface of the expanded diameter section 11 to thereby prevent the lid-side seat winding section 52 from rubbing against the inner circumferential surface of the expanded diameter section 11 when the coiled spring 50 is inserted into the cylinder hole 10.

As described above, the coiled spring 50 according to the present embodiment is made of three steps which are the plunger-side seat winding section 53 of a small diameter, the effective winding section 51 of an intermediate diameter, and the lid-side seat winding section 52 of a large diameter (see FIG. 2).

As shown in FIG. 1, the lid-side seat winding section 52 is located at the one end side of the cylinder hole 10 with respect to the suction port 110 and the discharge port 120. That is, the lid-side seat winding section 52 is located in a position not opposed to the suction port 110 and the discharge port 120.

In the coiled spring 50, a part of the lid member 20 extends past the lid-side seat winding section 52 toward the plunger-side seat winding section 53 side. That is, the lid-side seat winding section 52 is fit in an annular space formed between the surface of the lid member 20 and the inner circumferential surface of the expanded diameter section 11.

The one end of the coiled spring 50 is guided by the surface (spherical surface) of the lid member 20 so that the axis of the coiled spring 50 is aligned with the center of the lid member 20, whereby the coiled spring 50 is held coaxially with the lid member 20, and as a result, held in the center of the pump chamber 30.

The suction port 110 and the discharge port 120 open to the pump chamber 30 are formed in the inner circumferential surface of the cylinder hole 10.

The suction port 110 communicates with a suction fluid passageway 110A formed in the pump body 100. The brake fluid is sucked through the suction port 110 from the suction fluid passageway 110A into the pump chamber 30.

The discharge port 120 communicates with a discharge fluid passageway 120A formed in the pump body 100. The brake fluid is discharged through the discharge port 120 from the pump chamber 30 into the discharge fluid passageway 120A.

The suction fluid passageway 110A is provided with a suction valve 60 which is a stop valve allowing only influx of the brake fluid into the pump chamber 30.

The suction valve 60 includes: a cylindrical member 64 through which a suction hole 65 extends; a suction valve body 61 for sealing the opening formed at the pump chamber 30 side of the suction hole 65; a retainer 62 which accommodates the suction valve body 61; and a spring member 63 which is accommodated within the retainer 62.

The cylindrical member 64 is a cylindrical metal component and is fit within the suction fluid passage 110A. A valve seat of which diameter is enlarged in a funnel shape is formed at the opening edge portion on the pump chamber 30 side of the suction hole 65 which is formed at the center portion of the cylindrical member 64.

The suction valve body 61 is a metal component of a spherical shape. The suction valve body 61 seals the opening portion of the suction hole 65 when abutted against the valve seat of the suction hole 65.

The retainer 62 is a cylindrical lid member having a bottom portion. The end portion on the pump chamber 30 side of the cylindrical member 64 is fit into the opening portion of the retainer 62. The suction valve body 61 is housed within the retainer 62. A plurality of communicating holes are formed in the retainer 62 to thereby communicate the retainer 62 with the suction fluid passage 110A.

The spring member 63 is a coil spring disposed in a compressed state between the bottom portion of the retainer 62 and the suction valve body 61. The spring member 63 presses the suction valve body 61 to the suction hole 65 side.

When a value obtained by subtracting the brake fluid pressure on the upstream side (pump chamber 30 side) of the suction fluid passage 110A from the brake fluid pressure on the downstream side thereof becomes equal to or larger than a valve opening pressure (a biasing force of the spring member 63), the suction valve body 61 separates from the suction hole 65 to thereby open the suction valve 60.

The discharge fluid passageway 120A is provided with a discharge valve 70 which is a stop valve allowing only efflux of the brake fluid from the pump chamber 30.

The discharge valve 70 includes: a cylindrical member 74 through which a discharge hole 75 extends; a discharge valve body 71 for sealing the opening formed at the pump chamber 30 side of the discharge hole 75; a retainer 72 which accommodates the discharge valve body 71; and a spring member 73 which is accommodated within the retainer 72.

The discharge valve 70 is a stop valve that has the same structure as the suction valve 60. When a value obtained by subtracting the brake fluid pressure on the downstream side of the suction fluid passage 120A from the brake fluid pressure on the upstream side (pump chamber 30 side) thereof becomes equal to or larger than a valve opening pressure (a biasing force of the spring member 73), the discharge valve body 71 separates from the discharge hole 75 to thereby open the suction valve 70.

Next, behaviors of the plunger pump 1 according to the present embodiment will be explained.

As shown in FIG. 1, as the cam surface 141 of the rotating eccentric cam 140 pushes the plunger 40 to move it forth toward the one end side in the axial direction when the pump chamber 30 is filled with the brake fluid, the volume of the pump chamber 30 decreases to increase the pressure of the brake fluid inside the pump chamber 30. The increased pressure opens the discharge valve 70, allowing the brake fluid inside the pump chamber 30 to be discharged through the discharge port 120 into the discharge fluid passageway 120A.

Then, the plunger 40 moves to a position closest to the one end side, which minimizes the volume of the pump chamber 30, and then, the cam surface 141 moves away from the plunger 40, when the plunger 40, which is under the pressing force of the coiled spring 50, moves back toward the cam surface 141 side in the axial direction, which increases the volume of the pump chamber 30.

The increase in the volume of the pump chamber 30 turns the pressure inside the pump chamber 30 into a negative pressure, which opens the suction valve 60, allowing the brake fluid to be sucked from the suction fluid passageway 110A through the suction port 110 into the pump chamber 30.

Then, the plunger 40 moves back to a position closest to the other end side, which maximizes the volume of the pump chamber 30, and then, the plunger 40 is pushed by the cam surface 141 to move forth again, which, as in the case of the above-described forward movement of the plunger 40, pressurizes the brake fluid within the pump chamber 30 to cause the brake fluid to be discharged into the discharge fluid passageway 120A.

According to the plunger pump 1 constructed as described above, as shown in FIG. 3, the lid-side seat winding section 52, which has a diameter larger than the outer diameter of the effective winding section 51, abuts against the lid member 20. The lid-side seat winding section 52 is fit in the annular space between the surface of the lid member 20 and the inner circumferential surface of the expanded diameter section 11. Further, the contact between the plunger-side seat winding section 53 and the plunger 40 is at least partially a face-to-face contact between flat surfaces, and the contact between the lid-side seat winding section 52 and the lid member 20 is a line-to-line contact between curved surfaces.

Accordingly, in the plunger pump 1, compared to a one in which the lid-side seat winding section 52 has the same diameter as the effective winding section 51, the coiled spring 50 hardly deviates in the radius direction of the lid member 20, resulting in increased stability of the coiled spring 50 which is compressed and stretched within the pump chamber 30.

Further, since the one end of the coiled spring 50 is received by the surface (the spherical surface) of the lid member 20, the axial center of the coiled spring 50 is automatically aligned with the center of the lid member 20, locating the coiled spring 50 in the center of the pump chamber 30.

Further, the plunger pump 1 may be configured so that the other end of the coiled spring 50 is directly received by the end surface 41a of the plunger 40, not by a section provided on the one end 40a of the plunger 40 for receiving the coiled spring 50. Even with this configuration, the coiled spring 50 can be sufficiently stabilized, resulting in reduced manufacturing costs.

Further, since the opposite ends 40a, 40b of the plunger 40 are of the same shape, which relieves restriction on the orientation of the plunger 40 in the cylinder hole 10, resulting in improved assembly workability of the plunger 40.

Moreover, since the outer diameter D1 of the effective winding section 51 is larger than the outer diameter D3 of the plunger-side seat winding section 53, the coiled spring 50 can have increased and stabilized spring force. This configuration prevents the effective winding section 51 which is compressed and stretched from rubbing the inner circumferential surface of the expanded diameter section 11 and enables the outer diameter D1 of the effective winding section 51 to be enlarged by effective use of the inner diameter D6 of the expanded diameter section 11.

Further, as shown in FIG. 1, since the lid-side seat winding section 52 is located in a position not opposed to the suction port 110 and the discharge port 120, passages can be ensured between the suction port 110 and the discharge port 120 and the inside of the pump chamber 30. Also, the lid-side seat winding section 52 is less subjected to negative pressures generated at the suction port 110 and the discharge port 120 during the drive of the plunger pump 1, resulting in increased stability of the lid-side seat winding section 52 with respect to the lid member 20.

Moreover, the inner diameter D4 of the effective winding section 51 is larger than the outer diameter D5 of the plunger 40. If the coiled spring 50 is assembled into the cylinder hole 10 in the reverse orientation, the plunger 40 is inserted into the lid-side seat winding section 52 and the effective winding section 51 and enveloped in the effective winding section 51. In this state, no load is applied to the coiled spring 50 when the coiled spring 50 is assembled into the cylinder hole 10, which facilitates and ensures awareness of wrong assembly of the coiled spring 50 into the cylinder hole 10, preventing wrong assembly of the coiled spring 50.

In the above, the embodiment of the present invention has been described. The present invention, however, is not limited to the embodiment, and various modifications and changes are possible without departing from the scope of the invention.

For example, the one end 40a of the plunger 40 shown in FIG. 1 may be provided with a receiving section for receiving the other end of the coiled spring 50. The receiving section may be made of a member placed over the one end 40a of the plunger 40 and having a projection or projections for being inserted into the opening at the other end side of the coiled spring 50. Or, the receiving section may be a projection or projections formed on the end surface 41a of the plunger 40 for being inserted into the opening at the other end side of the coiled spring 50.

Further, the coiled spring 50 of the present embodiment is made of the three steps (the plunger-side seat winding section 53, the effective winding section 51, and the lid-side seat winding section 52) as shown in FIG. 3. The coiled spring 50, however, may be made up of two steps; one step being made of the plunger-side seat winding section 53 and the effective winding section 51 of a same smaller diameter, and the other step being made of the lid-side seat winding section 52 of a larger diameter.

Or, the effective winding section may have an increasing diameter from the plunger-side seat winding section to the lid-side seat winding section so that the coiled spring has a circular truncated cone shape.

DESCRIPTION OF REFERENCE NUMERALS 1 plunger pump
10 cylinder hole
11 expanded diameter section
12 reduced diameter section
20 lid member
30 pump chamber
40 plunger
40c seal member
50 coiled spring
51 effective winding section
52 lid-side seat winding section
53 plunger-side seat winding section
53a contact surface
60 suction valve
70 discharge valve
100 pump body
110 suction port
120 discharge port
140 eccentric cam (drive member)
D1 outer diameter of effective winding section
D2 outer diameter of lid-side seat winding section
D3 outer diameter of plunger-side seat winding section
D4 inner diameter of effective winding section
D5 outer diameter of plunger
D6 inner diameter of expanded diameter section

The invention claimed is:
1. A plunger pump comprising:
a pump body formed of an approximately rectangular parallelepiped shape, having a cylinder hole with a reduced diameter section and an expanded diameter section;
a spherical lid member inserted by pressing in the expanded diameter section;
a plunger disposed in a slidable manner in the reduced diameter section, and having one end defining, together with the lid member, a pump chamber, and the other end abutting on a drive member;
a seal member held within the expanded diameter section and fit over the plunger; and
a coiled spring disposed within the expanded diameter section such that an axial center of the coiled spring is automatically aligned with a center of the lid member while remaining axially unrestrained with respect to the pump chamber,
the coiled spring including:
a plurality of coils;
an effective winding section comprising several of the plurality of coils compressible and stretchable in the axial direction of the plunger;
a lid-side seat winding section comprising a first coil of the plurality of coils abutting on a surface of the lid member; and
a plunger-side seat winding section comprising a second coil of the plurality of coils directly abutting on an end surface of the plunger,
the first coil and the second coil each respectively comprising one coil of the plurality of coils;
the several of the plurality of coils of the effective winding section being located between the first coil and the second coil,
the lid-side seat winding section having an outer diameter larger than an outer diameter of the effective winding section and smaller than or equal to an inner diameter of the expanded diameter section,
the plunger-side seat winding section having an outer diameter smaller than an outer diameter of the plunger;
wherein the outer diameter of the effective winding section is larger than the outer diameter of the plunger-side seat winding section;
wherein the first coil of the lid-side seat winding section is made of a wire having a circular cross section, and the second coil of the plunger-side seat winding section has a contact surface making a face-to-face contact with the end surface of the plunger such that the contact surface of the plunger-side seat winding section is parallel to the end surface of the plunger;
wherein the first coil of the lid-side seat winding section has a tip end with the circular cross section such that a contact between the first coil of the lid-side seat winding section and the lid member is a line-to-line contact between a bent surface of the first coil having the circular cross section of the lid-side seat winding section and a bent surface of the lid member;
wherein one end including the first coil of the coiled spring is directly guided by a spherical surface of the lid member without being fixed thereto and other end including the second coil of the coiled spring is directly guided by the end surface of the plunger without being fixed thereto such that an elongated axis of the coiled spring is automatically aligned with a center of the lid member and with an elongated axis of the plunger thereby stabilizing the coiled spring;

wherein said cylinder hole has one end thereof located at one surface of the pump body, said one surface having a retaining section, and an opening portion including a bottom portion formed therein; and wherein when the lid member is inserted by pressing into the expanded diameter section, the bottom portion of the opening portion is pressed by using a jig so that the bottom portion protrudes toward an inner direction of the expanded diameter section whereby the lid member is locked by an inner circumferential surface of the expanded diameter section and retained by the retaining section, said retaining section being formed by plastically deforming a wall surrounding the cylinder hole.

2. The plunger pump of claim 1, wherein the plunger has opposite end surfaces as flat surfaces.

3. The plunger pump of claim 1, wherein a part of the lid member extends past the lid-side seat winding section toward the plunger-side seat winding section side.

4. The plunger pump of claim 1, wherein the lid-side seat winding section is located at one end side of the cylinder hole with respect to a suction port of and a discharge port of the pump chamber.

5. The plunger pump of claim 1, wherein the effective winding section has an inner diameter larger than the outer diameter of the plunger.

* * * * *